US012519748B2

(12) United States Patent
Shcherbin et al.

(10) Patent No.: US 12,519,748 B2
(45) Date of Patent: Jan. 6, 2026

(54) ENTITY MATCHING ACROSS TELEMETRIES

(71) Applicant: Cisco Technology, Inc., San Jose, CA (US)

(72) Inventors: Kyrylo Shcherbin, Prague (CZ); Jan Stercl, Prague (CZ); Jan Kohout, Roudnice nad Labem (CZ); Martin Kopp, Komarov (CZ)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/110,138

(22) Filed: Feb. 15, 2023

(65) Prior Publication Data

US 2024/0031328 A1    Jan. 25, 2024

Related U.S. Application Data

(60) Provisional application No. 63/390,956, filed on Jul. 20, 2022.

(51) Int. Cl.
*H04L 61/4594* (2022.01)

(52) U.S. Cl.
CPC .............. *H04L 61/4594* (2022.05)

(58) Field of Classification Search
CPC .............................................. H04L 61/4594
See application file for complete search history.

(56) References Cited

U.S. PATENT DOCUMENTS

| 10,237,294 | B1 * | 3/2019 | Zadeh | H04L 61/103 |
| 11,218,487 | B1 * | 1/2022 | Iles | G06N 20/00 |
| 2018/0034941 | A1 * | 2/2018 | Toledo | G06Q 10/10 |
| 2023/0239313 | A1 * | 7/2023 | Peters | H04L 63/1425 |
| | | | | 726/22 |

OTHER PUBLICATIONS

Barlaug et al. "Neural Networks for Entity Matching: A Survey", https://arxiv.org/pdf/2010.11075 (Year: 2020).*
Barlaug et al.; Neural Networks for Entity Matching: a Survey; ACM Trans. Knowl. Discov. Data, vol. 15, No. 3, Apr. 1, 2021, 36 Pages.

(Continued)

*Primary Examiner* — Glenton B Burgess
*Assistant Examiner* — Patrick F Ngankam
(74) *Attorney, Agent, or Firm* — Lee & Hayes, P.C.

(57) ABSTRACT

This disclosure describes techniques for matching entities across a computing network using data from different telemetries. The techniques include receiving telemetry data of the computing network, the telemetry data including identifying information corresponding to an entity, associated information of the computing network, and/or timestamps. The techniques also include establishing one or more time windows based at least in part on the timestamps. A particular time window may be determined to correspond to the associated information. The techniques may include attributing the associated information to the entity. In some cases, an address book may be maintained, including mappings of the identifying information, the associated information, and/or time windows.

20 Claims, 11 Drawing Sheets

(56) References Cited

OTHER PUBLICATIONS

Bellrae et al., Active Sampling for Entity Matching; KDD '12: Proceedings of the 18th ACM SIGKDD International Conference on Knowledge Discovery and Data Mining; Aug. 2012, pp. 1131-1139, Published Aug. 12, 2012, 9 Pages.

Kopcke et al., Frameworks for Entity Matching: a Comparison; Data Knowl. Eng. (2009); Oct. 3, 2009, 14 Pages.

Shen et al., Constraint-Based Entity Matching; AAAI-05: Proceedings of the 20th Natinoal Conference on Artificial Intelligence; vol. 2; Jul. 2005; Published Jul. 9, 2005, pp. 862-867, 6 Pages.

* cited by examiner

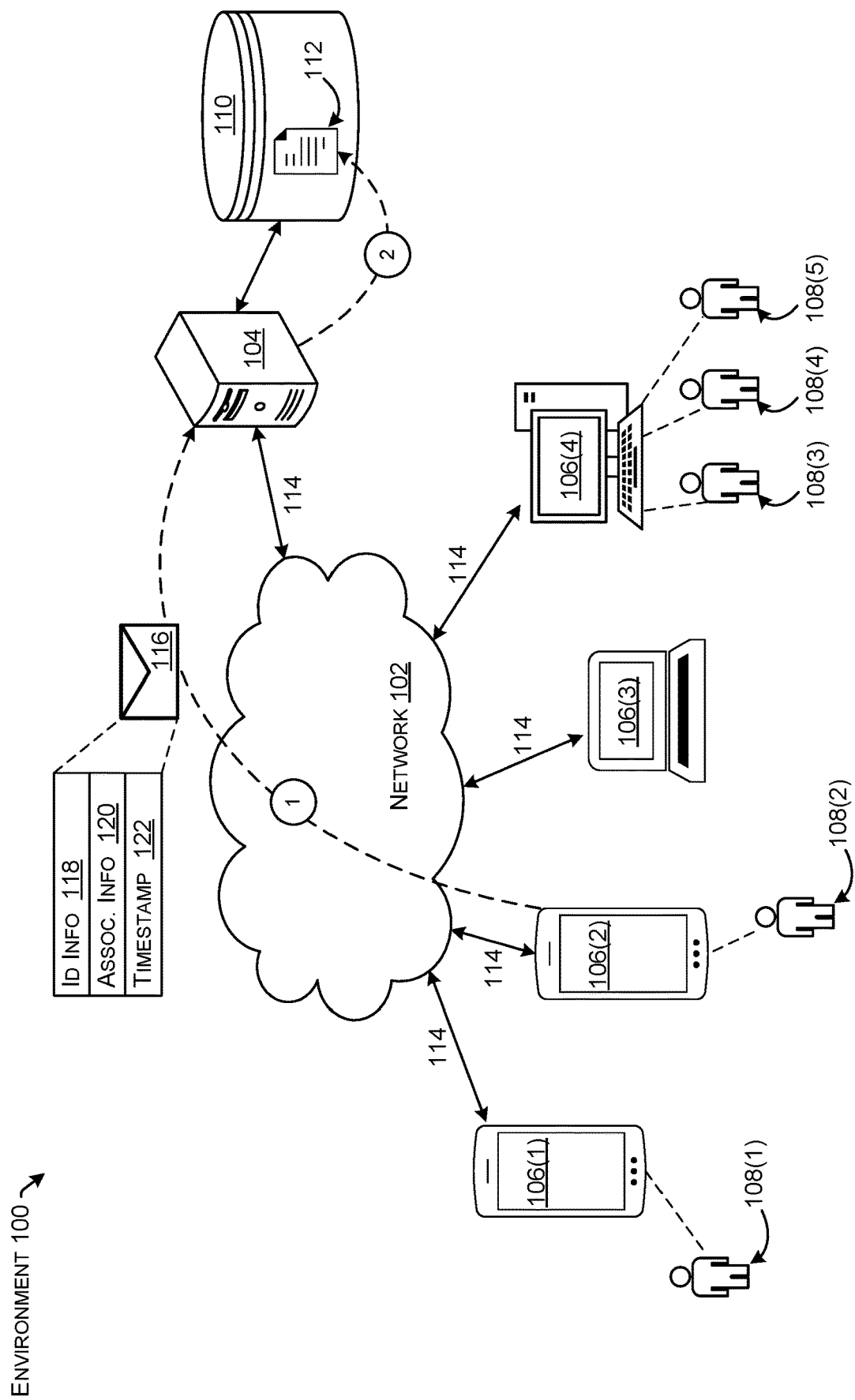

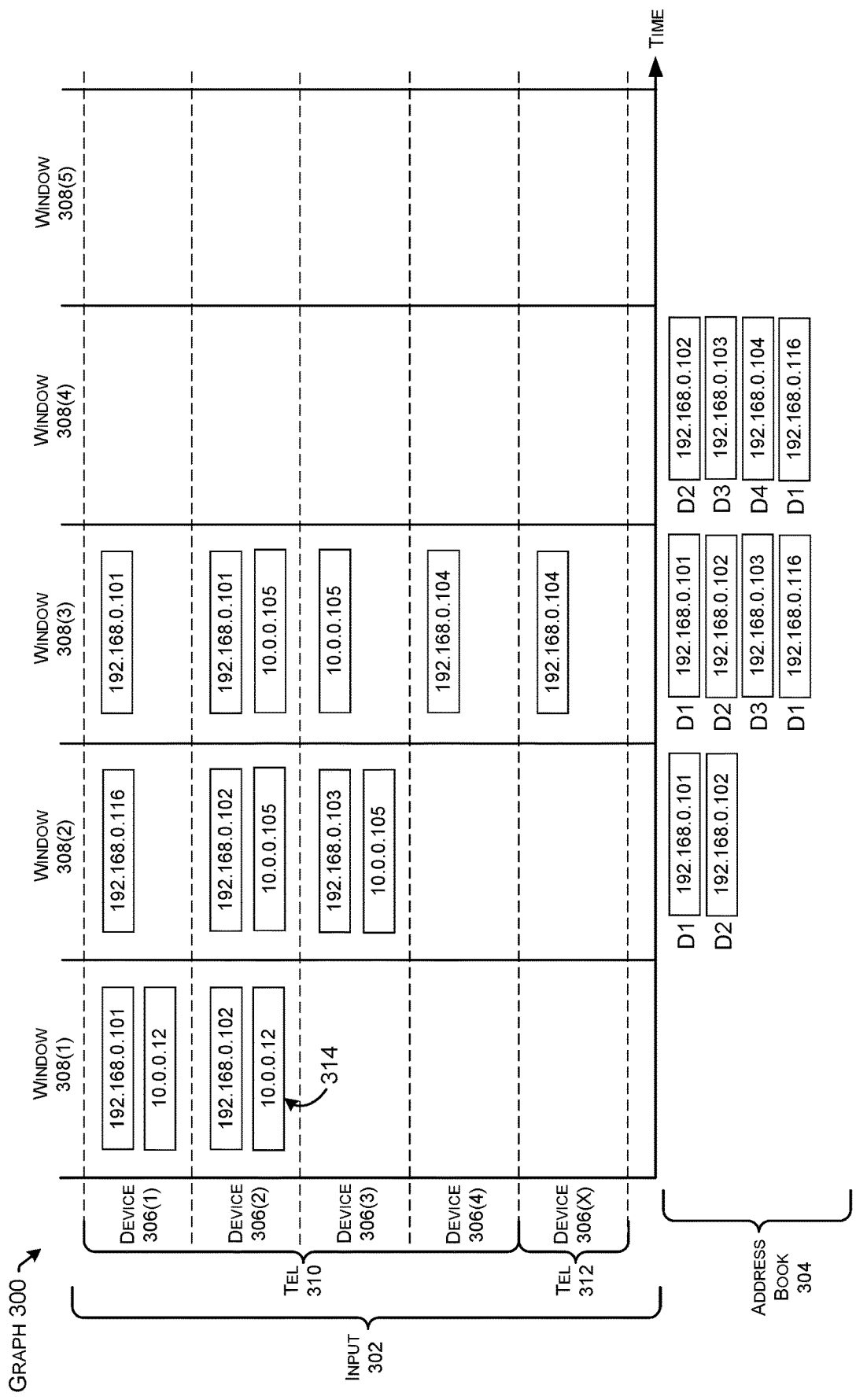

ENTITY MATCHING ACROSS TELEMETRIES

RELATED APPLICATIONS

This application claims priority to U.S. Provisional Application No. 63/390,956, filed on Jul. 26, 2022, the entire contents of which are incorporated herein by reference.

TECHNICAL FIELD

The present disclosure relates generally to the identification and management of entities involved in network communications, thereby improving performance of network operations.

BACKGROUND

In network environments, users may communicate information across the network from a computing device, and may connect, disconnect, and/or change to a different computing device from time to time for subsequent communication. The type of information included and/or discoverable in any given communication, and the source of collection of the information, may differ widely from one instance to the next. For at least these reasons, it may be difficult to differentiate any one entity (e.g., user, device) from the observed information. Furthermore, it may be difficult to attribute observed information to a known entity, particularly if the information is received from a different telemetry or represents a different category of information than is previously associated with the known entity. Without being able to differentiate entities from observed information, management of information, operations, and/or security of a network may be inefficient.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 1A and 1B illustrate component diagrams with an example environment in which entity matching may be employed as part of communications between network devices, in accordance with the present concepts.

FIGS. 3A-3D illustrates graphs that relate to an example address book that may be generated in accordance with the present entity matching concepts.

DESCRIPTION OF EXAMPLE EMBODIMENTS

Overview

Figure 1B:
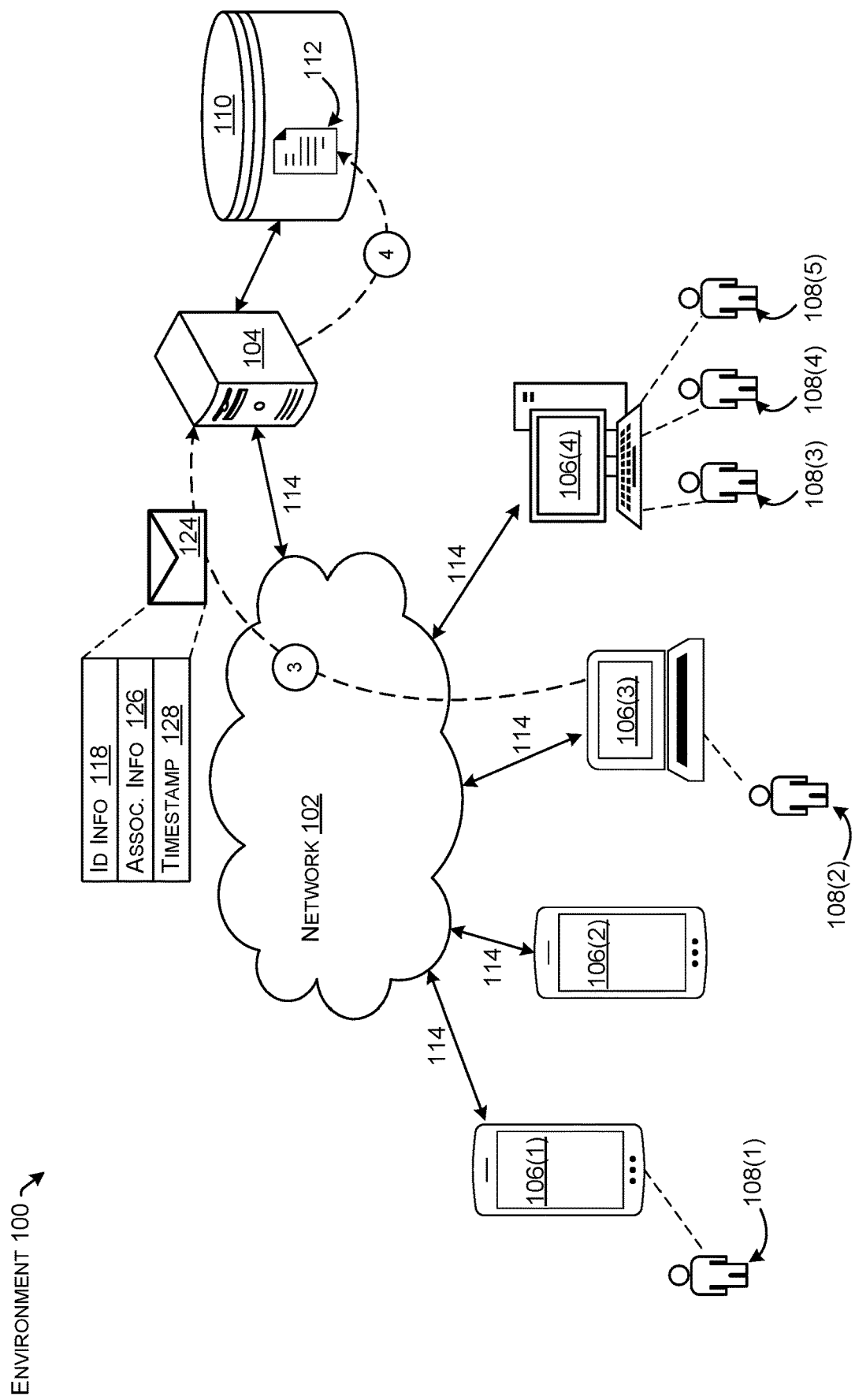

This disclosure describes, at least in part, a method that may be implemented by a server device communicatively coupled to one or more devices of a computing network. The method may include receiving telemetry data of a computing network. In some examples, the telemetry data may include identifying information corresponding to an entity, associated information of the computing network, and/or multiple timestamps. The method may include establishing one or more time windows based at least in part on the multiple timestamps. The method may also include determining a particular time window of the one or more time windows that corresponds to the associated information of the computing network. In some examples, the method may include attributing the associated information to the entity. Further, the method may include maintaining an address book that includes a mapping. The mapping may relate to the identifying information of the entity, the associated information, and/or the particular time window, for instance.

This disclosure also describes, at least in part, another method that may be implemented by a server device communicatively coupled to one or more devices of a computing network. The method may include receiving first input corresponding to an entity of a computing network. The first input may be received via a first telemetry, for instance. The method may include maintaining an address book based at least in part on the first input. In some examples, the address book may be maintained relative to time windows. The method may include receiving second input corresponding to the computing network. The second input may be received via a second telemetry, for instance. Based at least in part on the time windows of the address book, the method may include determining that the second input corresponds to the entity.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for matching entities across different telemetries. A common shared identifier for each entity, such as an identifier associated with a particular device or a particular user, may not be available across the telemetries (e.g., sources), making entity matching more difficult. In some examples, a heuristic solution may be used for matching entities from different sources of data detection. The heuristic solution may allow automated entity matching for wide-ranging data detection sources. By attributing data from multiple sources to a particular entity, the techniques may enable more robust and sophisticated analysis of the data.

In some implementations, the disclosed techniques may be used to connect a broad portfolio of security products. In general, available security products may model and/or represent entities differently. For instance, end-point telemetry, network telemetry, firewall logs, e-mails, etc., may use differing identifiers to recognize entities, such as a particular device or a particular user. Therefore, recognizing the same entity in multiple telemetries may be unexpectedly complicated. However, functional identification of the same entity in different telemetries may be critical for an effective solution, such as for extended detection and response (XDR). The disclosed techniques may help make output from security products more useful to a system administrator or other responsible person. For example, information about a monitored device and related alerts may be presented in one place, despite the information having originated from different sources of telemetry. In some instances, the disclosed techniques may simplify the work of a security operations center (SOC) team and/or allow more precise automation.

In some examples, an algorithm may combine inputs (e.g., information, data) about a computing network from multiple sources. The inputs may include identifying information and other associated information that corresponds to one or more entities of the computing network. For example, the identifying information may include at least one entity identification (ID) field that potentially uniquely identifies a particular entity, such as a user or a device. The identifying information may comprise a globally unique identifier (GUID) or universally unique identifier (UUID), for instance. With at least one entity identified (e.g., known), additional inputs may be matched to that entity. For instance, additional data collected from the same or a different telemetry/source may be viewed as associated information. The associated information may comprise an internet protocol (IP) address(es), data related to an application, data related to a user and/or device, etc. Furthermore, inputs may also include timestamps or other indication of time associated with the observations, communications, etc. The algorithm may be able to match at least some of the associated information to the identified entity. As such, a cross-domain detection system may be enabled to automatically match different representations of an entity from a variety of sources.

In some examples, the techniques may include creating and maintaining an address book and using it for matching entities observed in different telemetries as time progresses. The address book may be populated with identifying information from one telemetry, establishing the identity of at least one entity in the address book. Additional observed information may then be associated with the identified entity in the address book. The associated information may be attributed to the identified entity relative to a period of time. For example, over time, new information may suggest that a user is working with a different device and/or associated with a different IP address. In this instance, identifying information in the address book may correspond to the user, while associated information may include an IP address that was attributed to the user during a particular time window. The address book may be used to track the user over time, by updating the associated information using data collected from a variety of telemetries. As such, the associated information may subsequently include a new IP address that is attributed to the user during a subsequent time window.

The entity matching techniques disclosed herein may apply to a wide variety of use-case scenarios. The effectivity of the entity matching algorithm may be easily modified for a range of network management and/or security needs. For example, entity matching may be helpful to projects such as cross-domain alert fusion, cross-domain analytics, and/or user and entity behavior analytics (UEBA). Matching the entities from different telemetries may enable correlation and/or combination of signals, alerts, and observations from different sources (e.g., Secure Endpoint, StealthWatch, Umbrella, Firepower) and creation of a unified experience for the user or customer, in some cases. Matching entities may also enable cross-domain analytics for combining weak signals coming from multiple different sources to build much stronger detection. A relatively more sophisticated artificial intelligence/machine learning (AI/ML)-based solution may use entities embeddings, for instance, and/or may allow modeling and tracking users according to their behavior on the end point/network to identify reappearing users, etc. In some examples, the address book described above may be used to store the entities' behavioral profiles. The techniques may enable novel extended detection and response (XDR) use-cases. By matching raw telemetry or low-level detections, such as end-point telemetry, network telemetry, firewall logs and e-mails, the techniques may provide much better visibility into detection algorithms (anomaly detection, classification, and other AI/ML applications), for example. The techniques may also provide richer information to threat responders and/or analysts.

To summarize, a more efficient technique for matching entities across different telemetries may improve network management and/or operations. An address book may be built by starting with a known entity, matching additional information to the known entity, then associating the additional information with the known entity in the address book. The result may be a more efficient and robust method for collecting and organizing information that can empower responders and network analysts to improve the function and/or security of a network.

Although the examples described herein may refer to a user device as a source of information and/or communication associated with an entity, the techniques may generally be applied to any device in a network. Further, the techniques may be generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A and 1B collectively illustrate an example environment 100 in accordance with the present reusable acknowledgment concepts. Example environment 100 may include cloud computing network 102 (e.g., network), a server device 104 (e.g., server), and/or user devices 106. The user devices 106 may be associated with one or more users 108. In example environment 100 server device 104 may be associated with a database 110, which may include an address book 112. The use of a parenthetical after a reference number is intended to distinguish like elements. Use of the reference number without the associated letter is generic to the element. For instance, five users 108 are depicted in FIG. 1A. Also, four user devices 106 are depicted in FIGS. 1A and 1B, including user device 106(1), a mobile device; user device 106(2), a mobile device; user device 106(3), a laptop computer; and user device 106(4), a computer workstation. Note that user 108(1) is associated with user device 106(1)

in the example scenario depicted in FIG. 1A, indicated by a dashed line. Note that the occurrence, number, type, and/or arrangement of elements depicted in the example environment 100 in FIGS. 1A and 1B is not meant to be limiting. Any of a variety of types of user devices, server devices, or other elements are contemplated. For instance, database 110 may be physically located on server device 104.

Server device 104 may be communicatively coupled to various other devices, such as user devices 106 and database 110, via cloud computing network 102. Within the example environment 100, the server device 104, user devices 106, and/or other devices may exchange communications (e.g., packets) via a network connection(s) to cloud computing network 102, indicated by double arrows 114. For instance, network connections 114 may be transport control protocol (TCP) network connections or any network connection (e.g., information-centric networking (ICN)) that enables the server device 104 to exchange packets with other devices via cloud computing network 102. The network connections 114 represent, for example, data paths between the server device 104 and user devices 106. It should be appreciated that the term "network connection" may also be referred to as a "network path." The use of a cloud computing network in this example is not meant to be limiting. Other types of networks are contemplated in accordance with entity matching concepts.

FIGS. 1A and 1B show several examples of communications between server device 104 and various other network devices. The communications are indicated with dashed, numbered lines. For example, referring to FIG. 1A, at "Step 1," server device 104 may receive input 116 from user device 106(2). The input 116 may include identifying information 118, associated information 120, and/or a timestamp (s) 122. In some implementations, identifying information 118 may comprise a globally unique identifier (GUID) that corresponds to user device 106(2) and/or to user 108(2). The associated information 120 may include any of a variety of data categories, such as an IP address through which user device 106(2) is connected to the network 102, an email address, a MAC address, a physical location of the user device 106(2), a make and/or model type of user device 106(2), data regarding an operating system version of user device 106(2), etc. Additionally or alternatively, associated information 120 may include data particular to a user 108, or to an activity of a user 108, such as use of an application via a user device 106. Timestamp(s) 122 may comprise one or more timestamps or other indication of a time period relative to the identifying information 118 and/or the associated information 120.

At "Step 2," server device 104 may send some or all of input 116 to database 110. In some examples, input 116 may be added to address book 112. For instance, identifying information 118 may be recorded in address book 112, establishing a known entity. In this scenario, the identifying information 118 may correspond to user 108(2), therefore user 108(2) is known to the entity matching system. Also at Step 2, other data from input 116 may be added to address book 112. For instance, associated information 120 may include an IP address used by user device 106(2) during a particular time window. Therefore, the IP address and one or more timestamps may be added to address book 112, and these records may be associated with the known entity, user 108(2). (Example address book records will be described in greater detail relative to FIG. 3, below.)

FIG. 1B may be viewed as representing a subsequent time window relative to FIG. 1A. Note that in the subsequent time window, user 108(2) is associated with user device 106(3), rather than user device 106(2). Continuing with the example scenario introduced in FIG. 1A, at "Step 3," server device 104 may receive input 124 from user device 106(3). The input 124 may include identifying information 118, associated information 126, and/or a timestamp(s) 128. Therefore, in this scenario, input 124 includes the identifying information 118 attributed to user 108(2), suggesting that user 108(2) is now using user device 106(3).

At "Step 4," server device 104 may send some or all of input 124 to database 110, to be added to address book 112. In this manner, the address book 112 may be updated. Maintenance of the address book 112 through updates with ongoing input from devices of the network 102 may provide valuable insight to the operation and management of the network 102. Learning the history, associations, habits, profiles, or other relevant information of entities may allow an entity matching system to identify entities from disparate sources, including potentially matching entities when presented with data from different types of telemetries. The simple example address book entry and update in FIGS. 1A and 1B is not meant to be limiting. Additional example scenarios are provided relative to FIGS. 2 and 3, below.

Figure 2:
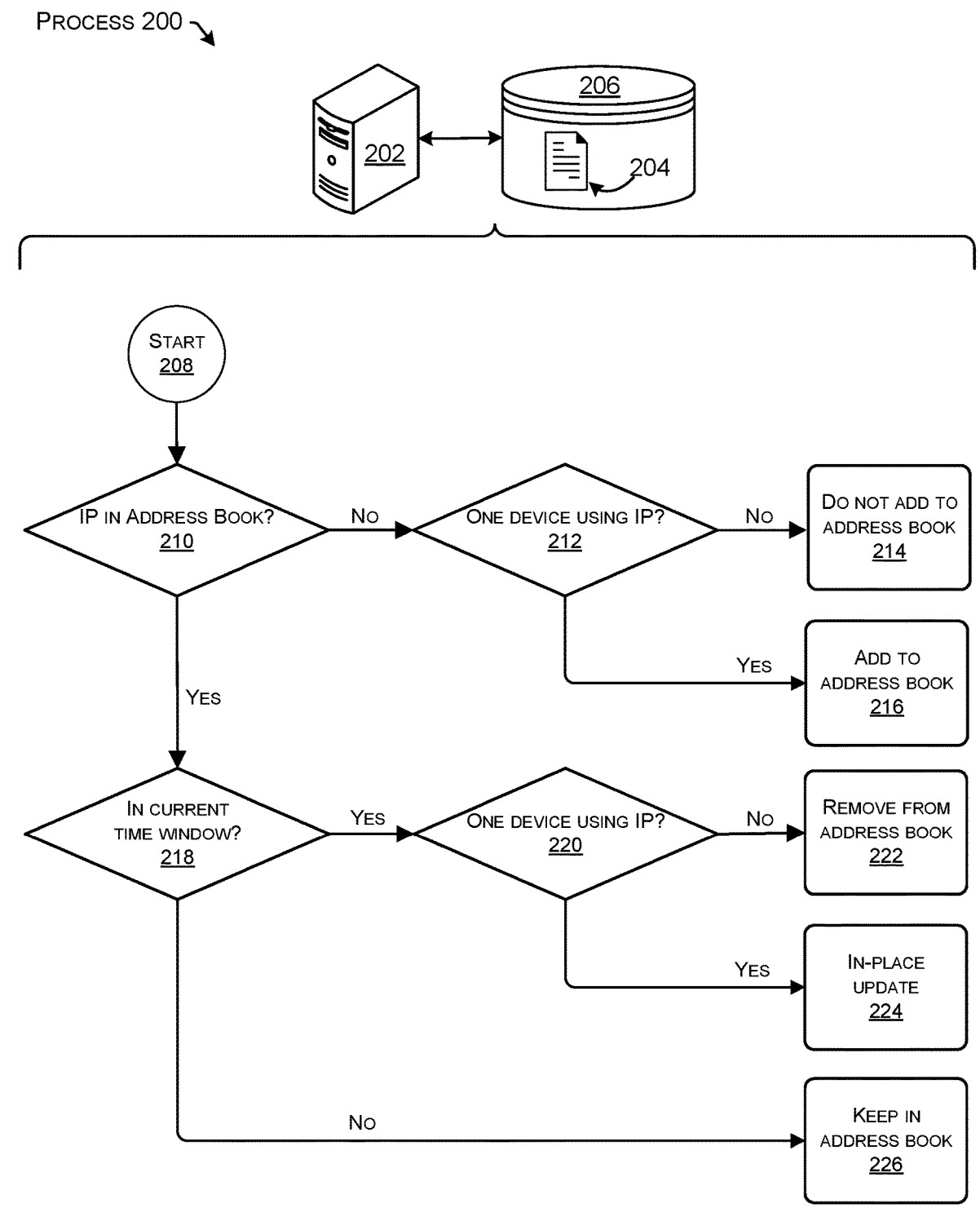
FIG. 2 illustrates a flow chart that relates to example process with operations that may be performed in accordance with the present entity matching concepts.

FIG. 2 illustrates a flow diagram of an example process 200 that represents an additional example scenario in accordance with the present entity matching concepts. Some aspects of the example shown in FIG. 2 may be similar to aspects of the examples described above relative to FIGS. 1A and 1B. Therefore, for sake of brevity, not all elements of FIG. 2 will be described in detail.

In some examples, process 200 may be performed by a server device 202 interacting with an address book 204, which may be stored in a database 206. Server device 202, address book 204, and database 206 may be similar to examples described above, such as server device 104, database 110, and/or address book 112 (FIGS. 1A and 1B), for instance. Process 200, as well as any process and/or operation described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples (e.g., server device 202), it is to be appreciated that other devices and components may perform some or all of these operations in other instances.

Example process 200 starts at 208. Process 200 may be repeated as a routine part of network management and/or operations. For instance, process 200 may be executed for different time windows, and potentially each time window. Process 200 may also be repeated according to received input. For instance, process 200 may be executed for each IP address, or other associated information received. Therefore, in some examples, process 200 may be repeated for each time window and for each IP address for which information is received in the time windows.

An operation 210 represents determining whether an IP address is present in the address book 204. If not, an operation 212 may include checking whether only one device is using the IP address in the current time window. In an instance where more than one device is using the IP address in the current time window, process 200 may proceed to operation 214, in which the IP address is not added to the address book 204. In this instance, the IP address may be relatively less differentiating regarding identification of an entity, since the IP address is attributed to more than one device in the current time window. Alternatively, operation 216 may represent an instance where only one device appears to be using the IP address in the current time window, in which case the IP address may be added to the address book 204. Note that the IP address may be associated with identification information for the corresponding one device (entity, in this scenario) in the address book 204.

Returning to operation 210, in an instance where the IP address is already in the address book, process 200 may proceed to operation 218. Operation 218 represents determining whether the IP address has been observed in the current time window. In an instance where data has been received corresponding to the IP address in the current time window, process 200 may proceed to operation 220 (which is similar to operation 212). Operation 220 may include checking whether only one device is using the IP address in the current time window. In an instance where more than one device is using the IP address in the current time window, process 200 may proceed to operation 222, in which the IP address is removed from address book 204. In this instance, the IP address may again be viewed as relatively less differentiating regarding identification of an entity, since the IP address is attributed to more than one device in the current time window, and therefore removed from the address book since the information is relatively less valuable. Alternatively, operation 224 may represent an instance where only one device appears to be using the IP address in the current time window, in which case an in-place update of address book 204 may be performed. Stated another way, the IP address may be retained in the address book 204, although the IP address may be associated with a different entity, in some cases.

Returning to operation 218, if the IP address is not observed in the current time window, process 200 may proceed to operation 226, representing leaving the IP address in address book 204. Once process 200 has concluded for a particular time window, process 200 may be repeated for another time window. In some examples, process 200 may be performed automatically and/or continuously as time progresses. In other examples, process 200 may be performed in response to a trigger event and/or command.

In some examples, process 200 may be viewed as an example algorithm which may be applied in various use case scenarios. In some implementations, the algorithm may be demonstrated on data sources used in a PoC implementation. For example, the algorithm may be run on net queries from Cloud Logs (e.g., Cisco Secure Endpoint (formerly AMP)), which may be used for parsing IP addresses, timestamps, and/or identification of AMP connector GUID(s). AMP connector GUID(s) may be uniquely tied to a single user device, for instance. In another example, the algorithm may be run on Cognitive Flows, which may be based on ingested Stealth Watch Flows, which may have suitable local IP addresses and also timestamps, for instance.

As described relative to FIG. 2, the example address book 204 may be created from the telemetry with known entity IDs. Items may be added to the address book using the (potentially) unique entity ID (connector GUID, for example) as a key and an IP address, which may be unique for the device within a time window, as a value. Entities from other telemetries may then be matched to a connector GUID based just on the potentially unique IP address, for instance. In some examples, the address book 204 may be updated every time window with respect to the operations shown in FIG. 2, for example. Note that operation 224 may represent a simple change in value. In operation 224, if the associated entity changed for the IP address entry, the value listed for the entity in the address book 204 would change. Therefore, stated another way, an address book may consist of logs of (potentially) unique IP addresses for a particular entity (e.g., device, user) in a particular time window. Entities observed in other sources, that have a matching IP address and timestamp, may be mapped to the unique identifier of the entity based on the logs from the address book. Another example address book is provided relative to FIGS. 3A-3D, below.

FIGS. 3A-3D collectively illustrate an example graph 300. Graph 300 provides a representation of input 302 and address book 304 relative to a timeline in an example entity matching scenario. Some aspects of the example shown in FIGS. 3A-3D may be similar to aspects of the examples described above relative to FIGS. 1A, 1B, and 2. Therefore, for sake of brevity, not all elements of FIGS. 3A-3D will be described in detail.

In the example shown in FIGS. 3A-3D, input 302 may include information corresponding to devices 306 (e.g., user devices). The information may also correspond to time windows 308. In graph 300, there are five devices 306 and five time windows 308. The use of a parenthetical after a reference number is intended to distinguish like elements. Use of the reference number without the associated letter is generic to the element. Furthermore, in the example scenario shown in FIGS. 3A-3D, input corresponding to devices 306(1)-306(4) is received from a first telemetry 310, while input corresponding to device 306(X) is received from a second telemetry 312. The "X" of device 306(X) is intended to suggest that the device may be unknown. In some examples, device 306(X) may match another entity. For instance, device 306(X) may be the same device as one of devices 306(1)-306(4). However, the identity of device 306(X) may not be known from input received from telemetry 312. For purposes of explanation, one input item 314 is designated. Input item 314 comprises an IP address shown as "10.0.0.12," and represents information corresponding to device 306(2) and time window 308(1), in this example scenario. Stated another way, graph 300 suggests that input 302 received from telemetry 310 indicate that IP address "10.0.0.12" may be attributed to device 306(2) during time window 308(1).

Figure 3A:
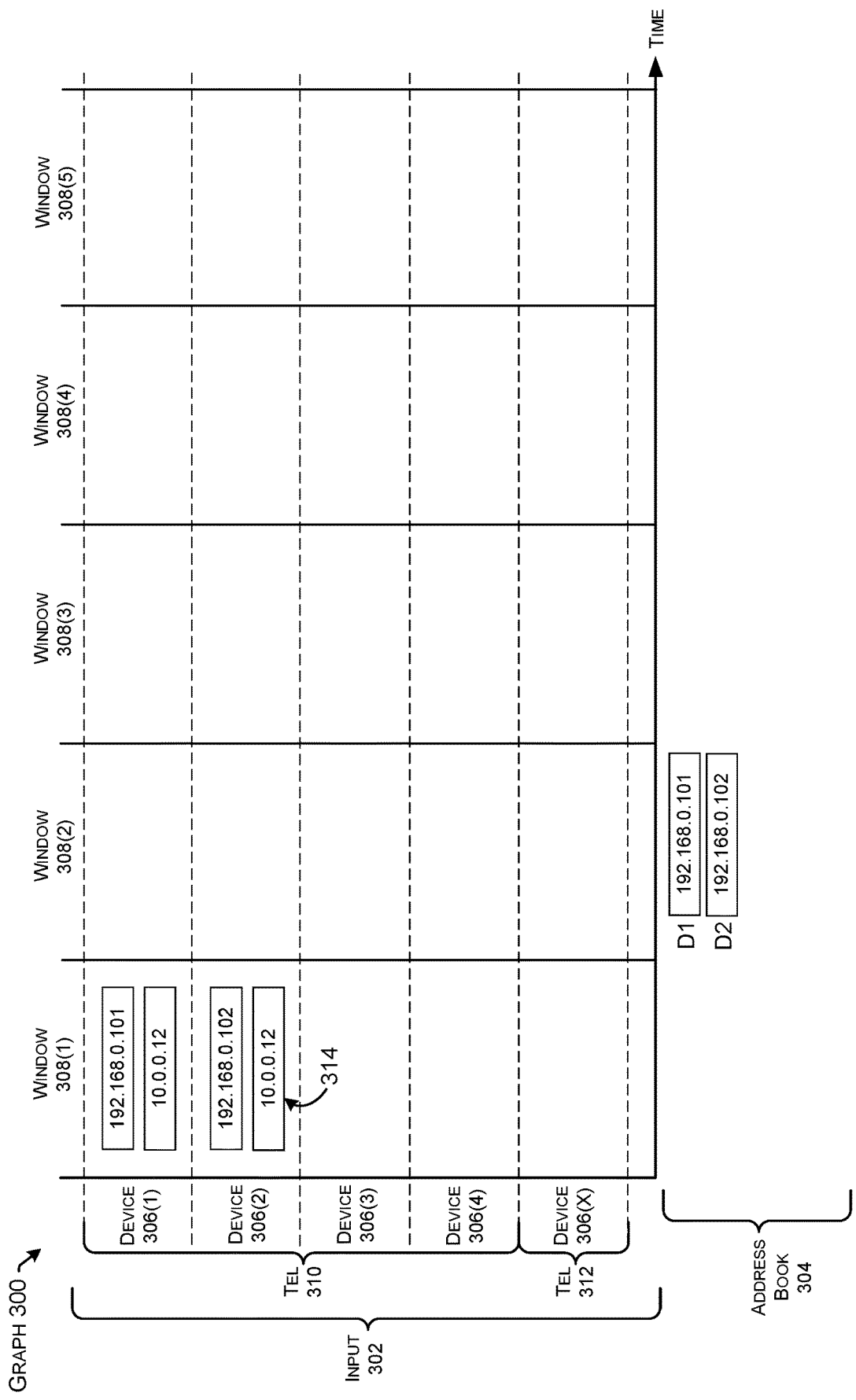

Referring to FIG. 3A, the example scenario may begin with receipt of input 302 from time window 308(1). The input 302 may be received by a server device, such as server device 104 in FIG. 1A. As shown in FIG. 3A, the input 302 for time window 308(1) is received via telemetry 310 (e.g., source). The input 302 may represent information that was generated during the time window 308(1). For instance, the input 302 may show that IP addresses "192.168.0.101" and "10.0.0.12" were attributed to device 306(1) during time window 308(1), and that IP addresses "192.168.0.102" and "10.0.0.12" were attributed to device 306(2) during time window 308(1). In some examples, time windows 308 may be established based on an even time interval. For instance, a time interval may be selected for the time windows 308, and received input 302 may then be placed in a time window 308 according to a timestamp. Note that other methods of time window 308 establishment are contemplated, including examples where an uneven and/or changing time interval may be used, and/or where various other information is considered toward the establishment of the time windows 308 or durations of time windows 308.

In response to receiving input 302, an address book 304 may be generated, populated, and/or updated with input 302. In FIG. 3A, the address book 304 is populated with the IP addresses received from time window 308(1). Note that in example graph 300, the address book 304 is depicted as being populated under time window 302(2), suggesting that data are not loaded into the address book 304 until time window 308(1) has passed, allowing data from time window 308(1) to be collected and analyzed. In other examples, an address book may be built concurrently, as input is received, for instance. In the example shown in FIG. 3A, the information added to the address book 304 under time window 302(2) includes the IP addresses "192.168.0.101" and "192.168.0.102." In some examples, the IP addresses may be added to the address book 304 as a result of an operation similar to operation 216 (FIG. 2). Also, note that IP address "10.0.0.12" may not be included in the address book 304, since it is attributed to two devices 306, similar to the result of operation 214 in FIG. 2.

Furthermore, as shown in FIG. 3A, the information added to the address book 304 includes an association with a device 306. For instance, IP address "192.168.0.101" is associated with device 306(1) (displayed as "D1"), while IP address "192.168.0.102" is associated with device 306(2) (displayed as "D2"). In this scenario, devices 306(1)-306(4) may be known through identifying information received through telemetry 310. For instance, telemetry 310 may provide the IP addresses along with identifying information corresponding to one or more of devices 306. Therefore, the address book 304 may be populated with entries that positively associate IP addresses with known devices 306.

Figure 3B:
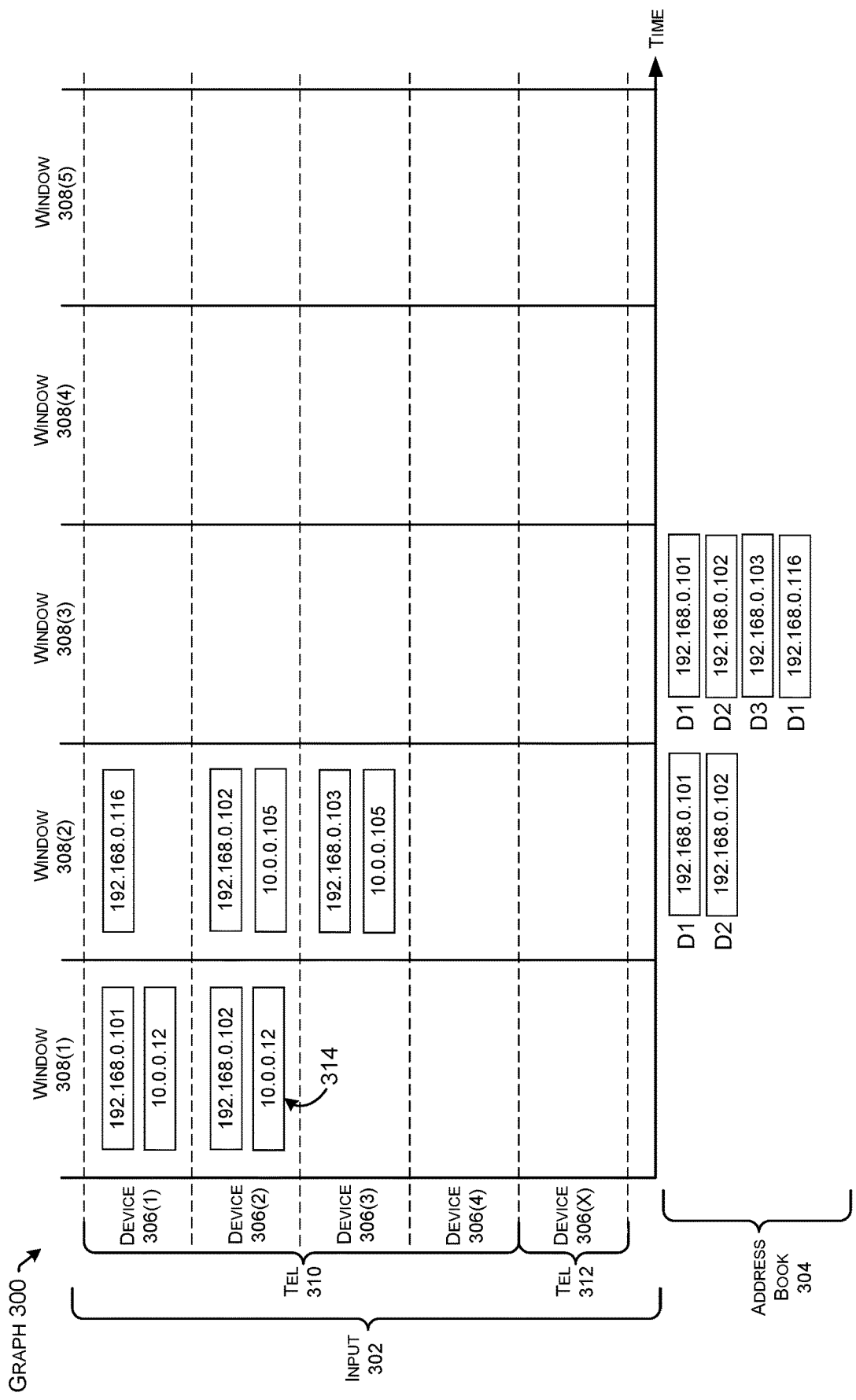

FIG. 3B depicts input 302 collected during time window 308(2), as well as the resultant address book 304 entries shown in the column for time window 308(3). In this instance, the first address book entry is similar to the result of operation 226 (FIG. 2), where IP address "192.168.0.101" is retained in address book 304 since it did not appear to have been used during time window 308(2), and therefore there is no conflict or other reason to remove it from the address book 304. The attribution to user device 306(1) is also retained. The second entry, for IP address "192.168.0.101" attributed to user device 306(2), is also retained, similar to the result of operation 224 (FIG. 2). Two new entries are added, one for user device 306(3), and another entry for user device 306(1). Note that "10.0.0.105" is not added, since it is attributed to more than one user device 306.

FIG. 3C depicts input 302 collected during time window 308(3), as well as the resultant address book 304 entries shown in the column for time window 308(4). As shown in FIG. 3C, input 302 has been received from second telemetry 312, as well as from telemetry 310. However, second telemetry 312 may not provide identifying information for the device 306(X).

In the instance shown in FIG. 3C, "192.168.0.101" may be attributed to both user device 306(1) and user device 306(2) during time window 308(3), therefore it is removed from address book 304, similar to the result of operation 222 (FIG. 2). Three existing IP addresses are retained in address book 304, including "192.168.0.102," "192.168.0.103," and "192.168.0.116." Note that once again "10.0.0.105" is not added, since it may be attributed to more than one user device 306.

Also in this instance, a new IP address "192.168.0.104" is added to address book 304 under time window 308(4). As shown in FIG. 3C, IP address "192.168.0.104" is attributed to both device 306(4) and device 306(X). Since the input 302 for device 306(X) was received from a different telemetry 312 than the input 302 for device 306(4) (which was received from telemetry 310), the observation of the IP address being used by both device 306(4) and device 306 (X), and not by other devices 306, may suggest that device 306(4) and device 306(X) are in fact the same device. Therefore, the IP address "192.168.0.104" may be added to the address book 304 with an attribution to device 306(4). As such, FIG. 3C may be viewed as illustrating an example of heuristically matching an entity from a first telemetry to an entity from a second telemetry.

Figure 3D:
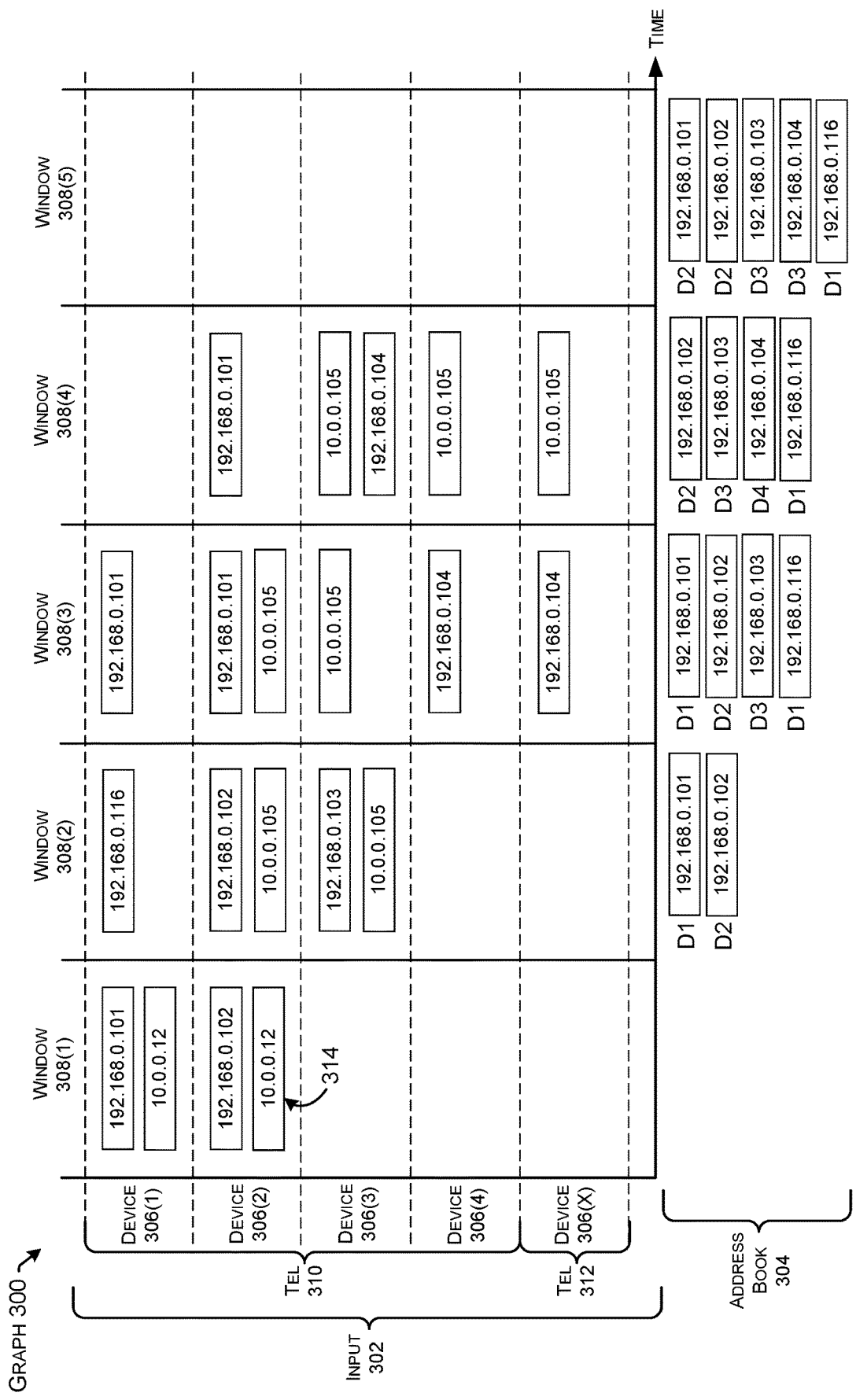

FIG. 3D depicts input 302 collected during time window 308(4), as well as the resultant address book 304 entries shown in the column for time window 308(5). In this instance, "192.168.0.101" is added back into the address book 304 with an attribution to device 306(2). Also, the address book 304 retains IP addresses associated with devices 306(1), 306(2), and 306(3). Also, the IP address "192.168.0.104" which was previously attributed to device 306(4), is now attributed to device 306(3), similar to the result of operation 224 in FIG. 2. Note that two IP addresses are associated with device 306(2) and also device 306(3) in the address book 304, in this instance. Also note that "10.0.0.105" is not added, since it may be attributed to more than one user device 306, including user device 306(3) and user device 306(4).

In some examples, the scenario depicted in FIGS. 3A-3D may be viewed as an example of a continuously updated address book 304, updated after each time window 308. Address book updates may happen in multiple ways, many of which are described above. In some implementations, the address book may be viewed as a dictionary-like data structure. For instance, entity IDs may be viewed as "keys," while associated information (e.g., IP addresses) are "values." In this manner, more than one value (e.g., IP address) may be tied to a particular key (e.g., device). An example is depicted in FIG. 3D, where two IP addresses are shown in the address book for device 306(2), under time window 308(5)). According to this structure, entities from one or more additional telemetries may be heuristically matched to entities from a first telemetry. In some examples, the first telemetry may have been used to generate and/or populate the address book, using identifying information from the first telemetry.

Figure 4:
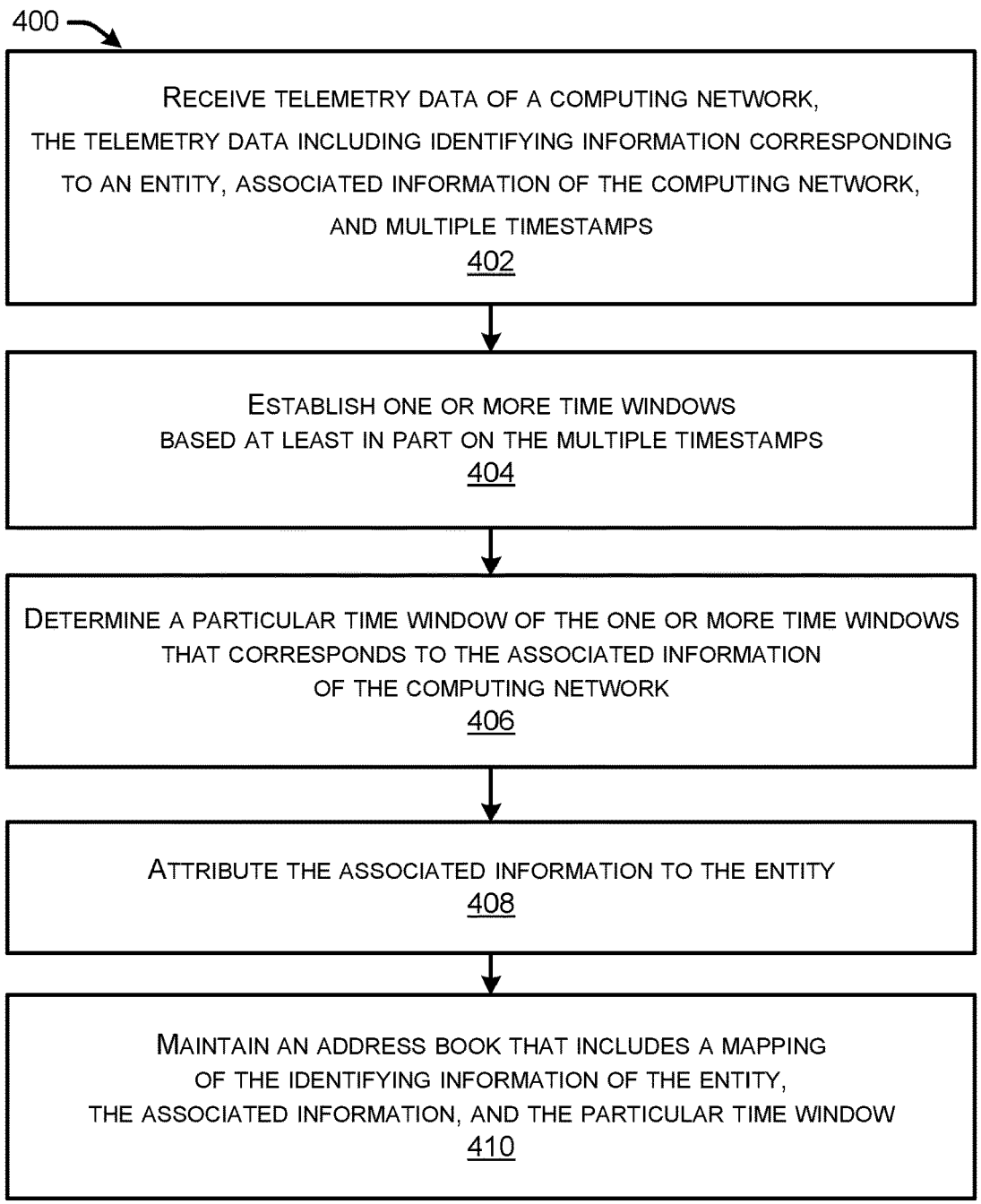
FIGS. 4 and 5 illustrate flow diagrams of example methods for entity matching as a part of communications among network devices, in accordance with the present concepts.
Figure 5:
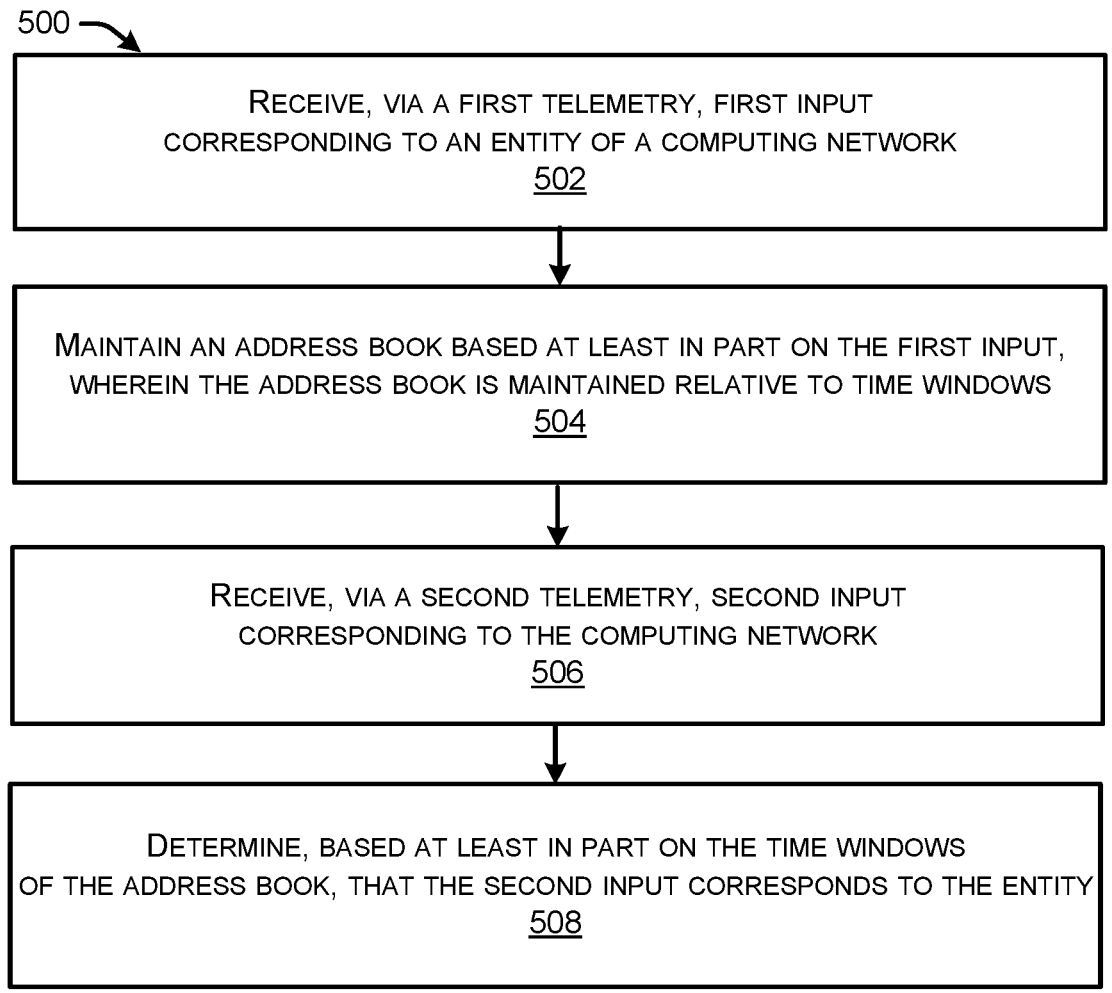

FIGS. 4 and 5 illustrate flow diagrams of example methods 400 and 500 that include functions that may be performed at least partly by a network device, such as server devices 104 or 202 described relative to FIGS. 1A-2. The logical operations described herein with respect to FIGS. 4 and 5 may be implemented (1) as a sequence of computer-implemented acts or program modules running on a computing system and/or (2) as interconnected machine logic circuits or circuit modules within the computing system. The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 4 and 5 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 4 illustrates a flow diagram of an example method 400 for network devices to perform entity matching techniques. Method 400 may be performed by a server device (e.g., server device 104 or 202) communicatively coupled to computing devices (e.g., devices 106 or 306), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include receiving telemetry data of a computing network. In some examples, the telemetry data may include identifying information corresponding to an entity. For instance, the identifying information may comprise a potentially unique identifier that is particular to a device or user. The identifying information may comprise a globally unique identifier (GUID), in some cases. The telemetry data may also include associated information of the computing network. For instance, associated information may include an IP address that is attributed to a device. The telemetry data may also include timestamps. The timestamps may be associated with communications, such as email logs, timing of sending of communication packets by one or more devices of the network, etc.

At 404, method 400 may include establishing one or more time windows based at least in part on the multiple timestamps. The time windows may be a consistent length of time or may vary depending on the situation. The length may be predetermined, programmed, or automatically selected.

At 406, method 400 may include determining a particular time window of the one or more time windows that corresponds to the associated information of the computing network. For instance, a particular time window may be determined as corresponding to use of a particular IP address.

At 408, method 400 may include attributing the associated information to the entity. For instance, the IP address may be attributed to a particular device.

At 410, method 400 may include maintaining an address book that includes a mapping of the identifying information of the entity, the associated information, and/or the particular time window.

In some examples, the method may include receiving additional associated information of the computing network. In one example, the associated information may comprises a first internet protocol (IP) address used by the entity, while the additional associated information may comprises a second IP address used by the entity. The method may also include determining a second time window of the one or more time windows that corresponds to the additional associated information of the computing network. Further, the method may include updating the address book to add a mapping of the identifying information of the entity, the additional associated information, and/or the second time window. In a different example, the method may include updating the address book by removing the mapping of the identifying information of the entity, the associated information, and the particular time window.

In some implementations, the telemetry data may correspond to a first telemetry source. The method may further comprise receiving additional telemetry data of the computing network. The additional telemetry data may correspond to a second telemetry source, for instance. Furthermore, the first telemetry source and the second telemetry source may represent different types of telemetry, with differing data fields and/or categories. The additional telemetry data may comprise additional associated information of the computing network. In some examples, the method may further include attributing the additional associated information to the entity. The attribution of the additional associated information to the entity may based at least in part on the mapping in the address book. For example, the method may include utilizing additional timestamps of the additional telemetry data to analyze the additional associated information relative to the particular time window. As such, attributing the additional associated information to the entity may be based at least in part on matching the associated information and the additional associated information relative to the particular time window.

FIG. 5 illustrates a flow diagram of an example method 500 for network devices to perform entity matching techniques. Method 500 may be performed by a server device (e.g., server device 104 or 202) communicatively coupled to computing devices (e.g., devices 106 or 306), for instance. In some examples, method 500 may be performed by a computing device comprising one or more processors and one or more non-transitory computer-readable media storing computer-executable instructions that, when executed by the one or more processors, cause the one or more processors to perform method 500.

At 502, method 500 may include receiving first input. The first input may be received via a first telemetry. The first input may correspond to an entity of a computing network, for instance. The first input may include identifying information, the identifying information differentiating the entity from another entity of the computing network.

At 504, method 500 may include maintaining an address book. The address book may correspond to the computing network. The address book may be based at least in part on entries related to the first input. Further, the address book may be maintained relative to time windows. Stated another way, information in the address book may be arranged relative to time windows. The time windows may be derived from information received from the computing network, such as information received via the first telemetry. In some examples, maintaining the address book may comprise adding at least one entry to the address book based at least in part on the first input, the entry including identifying information of the entity and associated information of the computing network. The entry may also be associated with a particular time window. Maintaining the address book may also comprise automatically updating the address book to incorporate additional input in successive time windows.

At 506, method 500 may include receiving second input. The second input may be received via a second telemetry. The second input may correspond to the computing network. However, it may initially be unknown whether the second input corresponds to the entity.

At 508, method 500 may include determining that the second input corresponds to the entity. The determination may be based at least in part on the time windows of the address book. For instance, information associated with a particular time window may be analyzed to determine a match, indicating that the second input corresponds to the entity.

Figure 6:
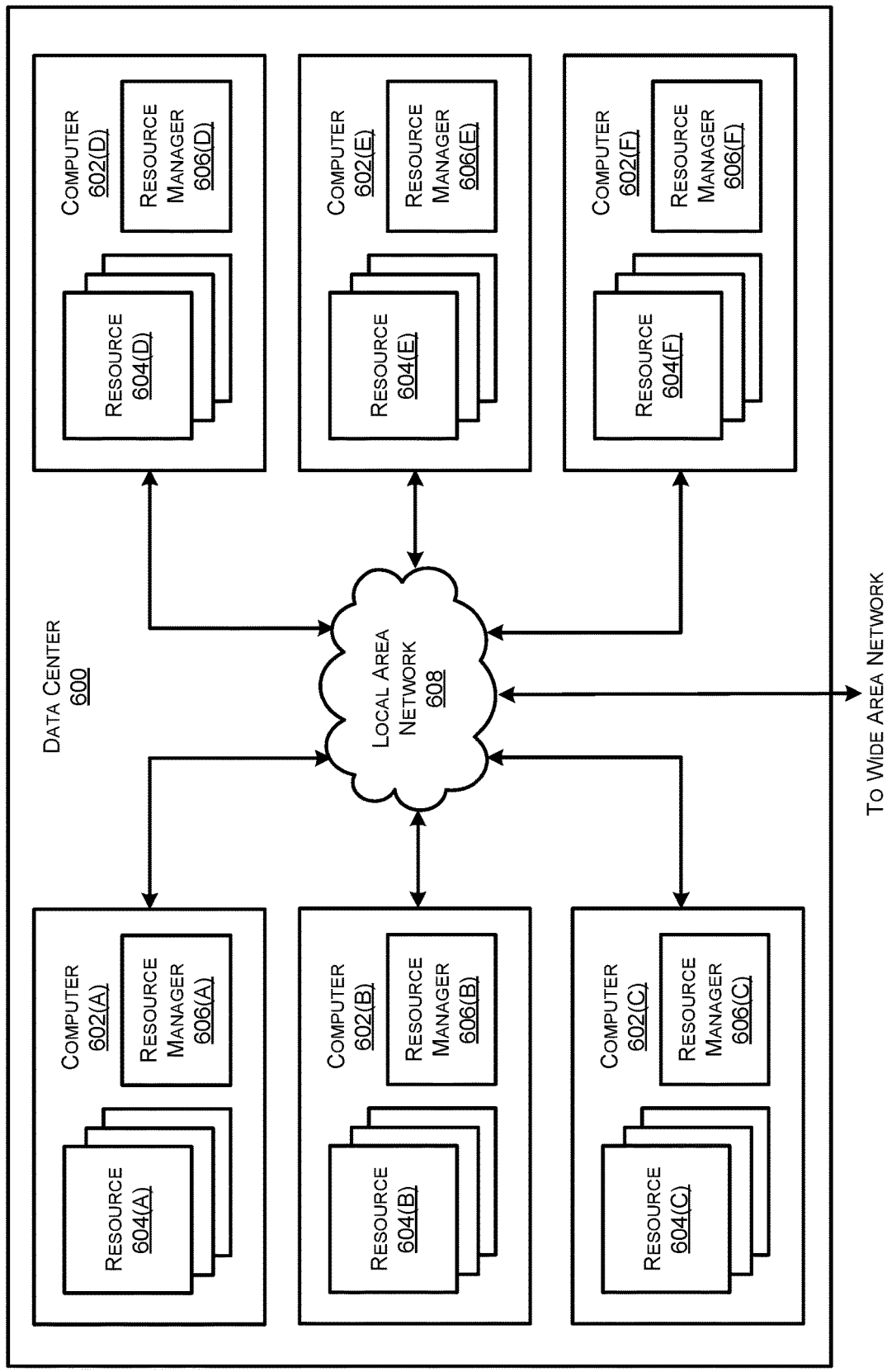
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as a server device (104, 202), or other device (106, 306), etc. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the computing network 102 or 608.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regards to FIG. 7.

Figure 7:
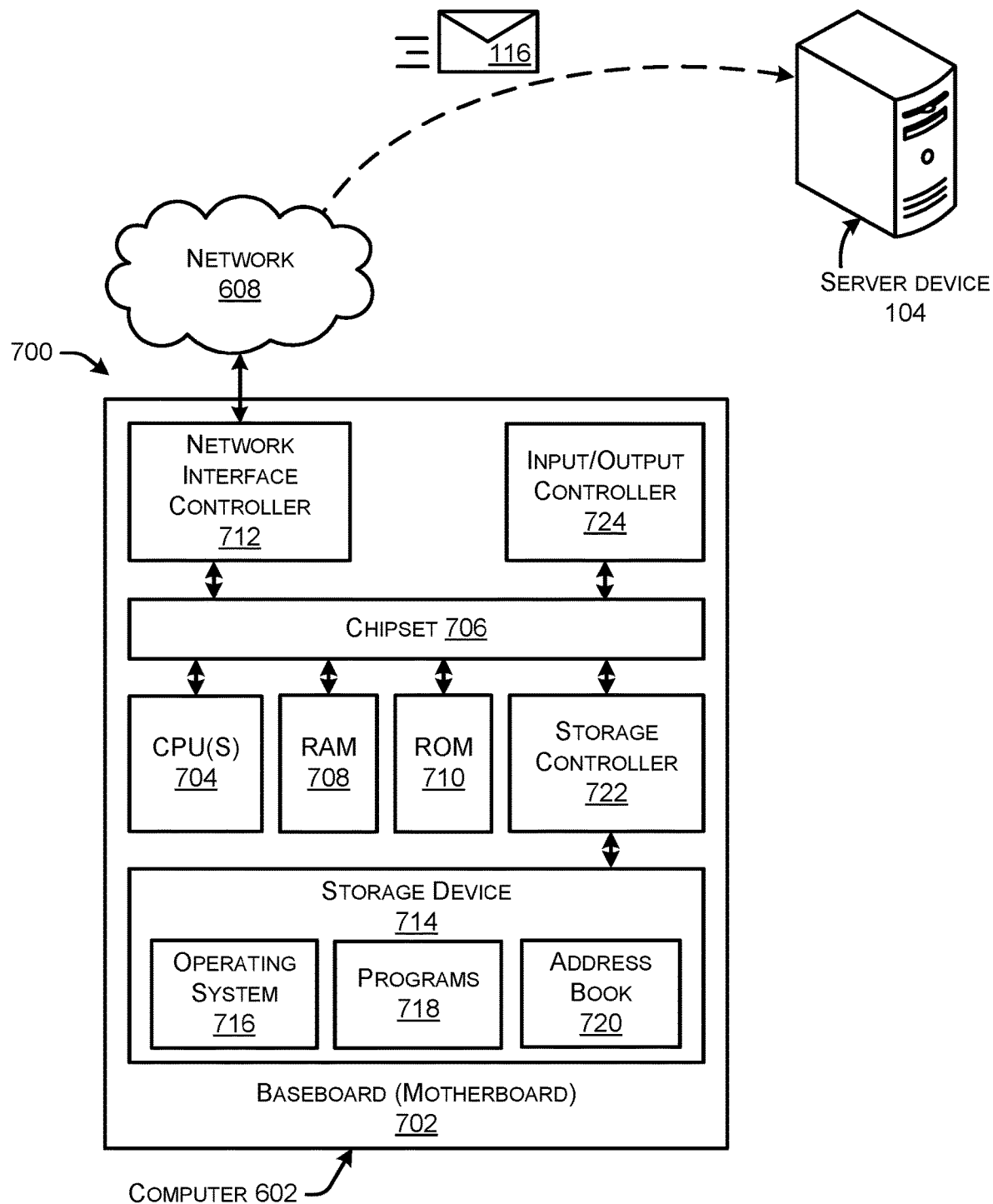
FIG. 7 is a computer architecture diagram showing an illustrative computer hardware architecture for implementing a device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., server device, user device, router, etc.), and may comprise networked devices such as servers, switches, routers, hubs, bridges, gateways, modems, repeaters, access points, etc. For instance, computer 602 may correspond to server device 104 or 202.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the networks 102 and/or 608. The chipset 706 can include functionality for providing network connectivity through a network interface controller (NIC) 712, such as a gigabit Ethernet adapter. The NIC 712 is capable of connecting the computer 602 to other computing devices over the network 102 and/or 608. For instance, in the example shown in FIG. 7, NIC 712 may help facilitate transfer of data, packets, and/or communications, such as input 116 and/or 302, over the network 608 with server device 104. It should be appreciated that multiple NICs 712 can be present in the computer 602, connecting the computer to other types of networks and remote computer systems.

The computer 602 can be connected to a storage device 714 that provides non-volatile storage for the computer. The storage device 714 can store an operating system 716, programs 718, address book 720 (which may be similar to address book 112 and/or 204), and/or other data. The storage device 714 can be connected to the computer 602 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 602 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 714 by detecting the physical states or characteristics of one or more particular locations within the physical storage units.

In addition to the mass storage device 714 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 102 and/or 608, and or any components included therein, may be supported by one or more devices similar to computer 602. Stated otherwise, some or all of the operations performed by the network 102 and/or 608, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 714 can store other system or application programs and data utilized by the computer 602.

In one embodiment, the storage device 714 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regards to FIGS. 1A-5. The computer 602 can also include computer-readable storage media having instructions stored thereupon for performing any of the other computer-implemented operations described herein.

The computer 602 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as server device 104 or 202, devices 106 or 306, and/or other devices. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by server device 104 or 202, and devices 106 or 306, and/or other devices. In some examples, the communications may include data, packet, input, timestamps, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with entity matching techniques. For instance, the programs 718 may cause the computer 602 to perform techniques for communicating with other devices using any type of protocol or standard usable for determining connectivity. Additionally, the programs 718 may comprise instructions that cause the computer 602 to perform the specific techniques for the matching of entities in a computer network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   receiving telemetry data of a computing network, the telemetry data including:
   identifying information corresponding to a first entity, associated information of the computing network, and multiple timestamps;
   establishing two or more time windows based at least in part on the multiple timestamps;
   maintaining an address book comprising the two or more time windows, the address book including a first mapping of the associated information of the first entity to a particular time window;
   receiving additional telemetry data of the computing network, the additional telemetry data corresponding to a second telemetry source, the additional telemetry data comprising additional associated information of an unknown second entity of the computing network;
   determining a second mapping of the additional associated information of the unknown second entity to the particular time window; and
   based at least in part on the first mapping and the second mapping, matching the first entity to the unknown second entity.

2. The computer-implemented method of claim 1, further comprising:
   updating the address book to attribute the identifying information to the unknown second entity.

3. The computer-implemented method of claim 1, wherein the associated information comprises an internet protocol (IP) address used by the first entity and the additional associated information comprises a same IP address used by the unknown second entity.

4. The computer-implemented method of claim 1, further comprising:
   receiving further associated information of the computing network;
   determining a second time window of the two or more time windows that corresponds to the further associated information of the computing network; and
   updating the address book by removing the first mapping of the identifying information of the first entity, the associated information, and the particular time window.

5. The computer-implemented method of claim 1, wherein the identifying information comprises a globally unique identifier (GUID).

6. The computer-implemented method of claim 1, wherein the telemetry data correspond to a first telemetry source comprising one of:
   end-point telemetry;
   network telemetry:
   a firewall log; or
   e-mail.

7. The computer-implemented method of claim 6, wherein the second telemetry source comprises a different type of telemetry than the first telemetry source.

8. The computer-implemented method of claim 1, wherein matching the first entity to the unknown second entity comprises a heuristic discovery of an identity of the unknown second entity by analyzing the associated information and the additional associated information relative to the particular time window in the address book.

9. A server device comprising:
   one or more processors; and
   one or more non-transitory computer-readable media storing computer-executable instructions that, when executed by the one or more processors, cause the one or more processors to:
   receive telemetry data of a computing network, the telemetry data including:
   identifying information corresponding to a first entity, associated information of the computing network, and multiple timestamps;
   establish two or more time windows based at least in part on the multiple timestamps;
   maintain an address book comprising the two or more time windows, the address book including a first mapping of the associated information of the first entity to a particular time window;

receive additional telemetry data of the computing network, the additional telemetry data corresponding to a second telemetry source, the additional telemetry data comprising additional associated information of an unknown second entity of the computing network;

determine a second mapping of the additional associated information of the unknown second entity to the particular time window; and based at least in part on the first mapping and the second mapping, match the first entity to the unknown second entity.

10. The server device of claim 9, wherein the computer-executable instructions further cause the one or more processors to:

update the address book to attribute the identifying information to the unknown second entity.

11. The server device of claim 9, wherein the associated information comprises an internet protocol (IP) address used by the first entity and the additional associated information comprises a same IP address used by the unknown second entity.

12. The server device of claim 9, wherein the computer-executable instructions further cause the one or more processors to:

receive further associated information of the computing network;

determine a second time window of the two or more time windows that corresponds to the further associated information of the computing network; and update the address book by removing the first mapping of the identifying information of the first entity, the associated information, and the particular time window.

13. The server device of claim 9, wherein the identifying information comprises a globally unique identifier (GUID).

14. The server device of claim 9, wherein the telemetry data correspond to a first telemetry source comprising one of:

end-point telemetry;
network telemetry;
a firewall log; or
e-mail.

15. The server device of claim 14, wherein the second telemetry source comprises a different type of telemetry than the first telemetry source.

16. The server device of claim 14, wherein matching the first entity to the unknown second entity comprises a heuristic discovery of an identity of the unknown second entity by analyzing the associated information and the additional associated information relative to the particular time window in the address book.

17. A method comprising:

receiving, via a first type of telemetry, first input corresponding to an unknown first entity of a computing network;

maintaining an address book based at least in part on the first input, wherein the address book comprises a plurality of time windows and the first input is associated with at least one of the time windows in the address book;

receiving, via a second type of telemetry, second input corresponding to a second entity of the computing network; and determining, based at least in part on the time windows of the address book, that the unknown first entity is the second entity.

18. The method of claim 17, wherein maintaining the address book comprises adding an entry to the address book based at least in part on the second input, the entry including identifying information of the second entity and associated information of the computing network, and further wherein the entry is associated with a particular time window of the time windows of the address book.

19. The method of claim 17, wherein the second input received via the first second type of telemetry includes identifying information, the identifying information differentiating the second entity from another entity of the computing network.

20. The method of claim 17, further comprising:

automatically updating the address book to incorporate additional input in successive time windows of the address book.

* * * * *